US008477679B2

United States Patent
Sharifian et al.

(10) Patent No.: US 8,477,679 B2
(45) Date of Patent: Jul. 2, 2013

(54) RESOURCE ALLOCATION METHOD AND DEVICE FOR AMPLIFY-AND-FORWARD RELAY NETWORK

(71) Applicant: Huawei Technologies Co., Ltd., Shenzhen (CN)

(72) Inventors: Alireza Sharifian, Shenzhen (CN); Petar Djukic, Shenzhen (CN); Halim Yanikomeroglu, Shenzhen (CN); Jietao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/633,498

(22) Filed: Oct. 2, 2012

(65) Prior Publication Data
US 2013/0028171 A1 Jan. 31, 2013

Related U.S. Application Data

(63) Continuation of application No. PCT/CN2011/071416, filed on Mar. 1, 2011.

(30) Foreign Application Priority Data

May 13, 2010 (CN) .......................... 2010 1 0175925

(51) Int. Cl.
  *H04B 7/14* (2006.01)
  *H04B 7/00* (2006.01)
  *H04W 4/00* (2009.01)
(52) U.S. Cl.
  USPC ........................... 370/315; 370/310; 370/332
(58) Field of Classification Search
  USPC ....................................................... 370/315
  See application file for complete search history.

(56) References Cited

U.S. PATENT DOCUMENTS

| 2003/0223429 | A1 | 12/2003 | Bi et al. |
| 2006/0056526 | A1 | 3/2006 | Jain |
| 2006/0293076 | A1 | 12/2006 | Julian et al. |
| 2007/0036071 | A1 | 2/2007 | Herdin |

(Continued)

FOREIGN PATENT DOCUMENTS

| CN | 101399799 A | 4/2009 |
| CN | 101635973 A | 1/2010 |
| WO | WO 2009/102906 A1 | 8/2009 |
| WO | WO 2010/047466 A1 | 4/2010 |

OTHER PUBLICATIONS

Performance of amplify-and-forward and decode-and-forward Relays in LTE-Advanced Author:Abdallah Bou et al. Published: 2009.*

(Continued)

*Primary Examiner* — Noel Beharry

(57) ABSTRACT

The present invention provides a resource allocation method and device for an amplify-and-forward relay network. The method includes: obtaining channel information, where the channel information includes channel information between a base station BS and a relay station RS and channel information between the RS and each user equipment UE; calculating, according to the channel information, resource use information of each UE on each sub-channel pairing; and obtaining, according to the resource use information, the number of REs allocated to each UE on each sub-channel pairing, where the obtained number of the REs enables a preset first function to obtain a maximum value. In the embodiments of the present invention, the use efficiency of the resources may be improved.

13 Claims, 5 Drawing Sheets

U.S. PATENT DOCUMENTS

| | | | |
|---|---|---|---|
| 2007/0042717 A1 | 2/2007 | Alexiou et al. | |
| 2007/0098102 A1 | 5/2007 | Hottinen | |
| 2008/0260000 A1* | 10/2008 | Periyalwar et al. | 375/133 |
| 2009/0147706 A1 | 6/2009 | Yu et al. | |

OTHER PUBLICATIONS

Performance of Repeaters in 3GPP LTE Author: Sihombing, Anto (KTH, School of Information and Communication Technology (ICT), Communication Systems, CoS) http://urn.kb.se/resolve?urn=urn:nbn:se:kth:diva-48940 Year of publ.:2009.*

Relay architectures for 3GPP LTE-advanced Authors:Steven W. Peters, Ali Y. Panah, Kien T. Truong, Robert W. Heath EURASIP Journal on Wireless Communications and Networking—3GPP LTE and LTE Advanced archive vol. 2009, Mar. 2009, Article No. 1.*

International Search Report dated May 26, 2011 in connection with International Patent Application No. PCT/CN2011/071416.

Bin Fan, et al., "Subcarrier Allocation for OFDMA Relay Networks with Proportional Fair Constraint", 2009 IEEE, 5 pages.

Markus Herdin, "A Chunk Based OFDM Amplify-and-Foward Relaying Scheme for 4G Mobile Radio Systems", 2006 IEEE, p. 4507-4512.

Taneli Riihonen, et al., "Analysis of Subcarrier Pairing in a Cellular OFDMA Relay Link", 2008 IEEE, p. 104-111.

Ari Hottinen, et al., "Optimal Subchannel Assignment in a Two-Hop OFDM Relay", 2007, 5 pages.

Jeonghoon Mo, et al., "Fair End-to-End Window-Based Congestion Control", IEEE/ACM Transactions on Networking, vol. 8, No. 5, Oct. 2000, p. 556-567.

Harold J. Kushner, et al., "Convergence of Proportional-Fair Sharing Algorithms Under General Conditions", IEEE Transactions on Wireless Communications, vol. 3, No. 4, Jul. 2004, p. 1250-1259.

Ingmar Hammerstrom, et al., "Joint Power Allocation for Nonregenerative Mimo-OFDM Relay Links", 2006 IEEE, p. 49-52.

Chin Keong Ho, et al., "BER Minimization in Relay-Assisted OFDM Systems by Subcarrier Permutation", 2008 IEEE, p. 1489-1493.

Partial Translation of Written Opinion of the International Searching Authority in connection with International Patent Application No. PCT/CN2011/071416 dated May 26, 2011.

* cited by examiner

US 8,477,679 B2

RESOURCE ALLOCATION METHOD AND DEVICE FOR AMPLIFY-AND-FORWARD RELAY NETWORK

CROSS-REFERENCE TO RELATED APPLICATIONS

This application is a continuation of International Application No. PCT/CN2011/071416, filed on Mar. 1, 2011, which claims priority to Chinese Patent Application No. 201010175925.1, filed on May 13, 2010, both of which are hereby incorporated by reference in their entireties.

TECHNICAL FIELD

The present invention relates to mobile communications technologies and in particular to a resource allocation method and device for an amplify-and-forward relay network.

BACKGROUND

The relay technology is capable of effectively boosting the rate of cell users and then increasing the system capacity, thereby widening the coverage of a cellular network. Relay modes mainly include two types: amplify-and-forward (Amplify-and-Forward, AF) and decode-and-forward (Decode-and-Forward, DF). A relay network in AF mode is capable of reducing relay transmission delay and solving the security problem effectively. For resource scheduling of the relay network in AF mode, a key issue is to address the sub-channel pairing problem, that is, pairing the input sub-channel and output sub-channel of a relay station (Relay Station, RS) to effectively increase the end-to-end capacity of a link. In the prior art, the allocation process of AF mode is based on the specific scheduling principle of the sub-channel.

During the implementation of the present invention, inventors find out at least the drawback that the system use efficiency is poor due to the allocation based on the sub-channel.

SUMMARY

Embodiments of the present invention provide a resource allocation method and device for an AF relay network to improve the use efficiency of system resources.

An embodiment of the present invention provides a resource allocation method for an AF relay network, including:

obtaining channel information, where the channel information includes the channel information between a base station BS and a relay station RS and the channel information between the RS and each user equipment UE;

calculating, according to the channel information, resource use information of each UE on each sub-channel pairing; and obtaining, according to the resource use information, the number of resource elements REs allocated to each UE on each sub-channel pairing, where the obtained number of the REs enables a preset first function to obtain the maximum value.

An embodiment of the present invention provides a resource allocation device for an AF relay network, including:

a channel information obtaining module, configured to obtain channel information, where the channel information includes channel information between a base station BS and a relay station RS and channel information between the RS and each user equipment UE;

a use information obtaining module, configured to calculate, according to the channel information, resource use information of each UE on each sub-channel pairing; and an allocating module, configured to obtain, according to the resource use information, the number of resource elements REs allocated to each UE on each sub-channel pairing, where the obtained number of the REs enables a preset first function to obtain the maximum value.

Based on the above technical solutions, embodiments of the present invention obtain the number of REs allocated to each UE on each sub-channel pairing during the allocation, that is, the allocation is based on REs; therefore, during the scheduling, REs from the same sub-channel may be allocated to different UEs to improve the use efficiency of the system.

BRIEF DESCRIPTION OF THE DRAWINGS

To make the technical solutions of the present invention clearer, the accompanying drawings for illustrating various embodiments of the present invention are described below. Apparently, the accompanying drawings are for the exemplary purpose only, and persons of ordinary skill in the art can derive other drawings from such accompanying drawings without any creative effort.

DETAILED DESCRIPTION

The objectives, technical solutions, and beneficial effects of the embodiments of the present invention are described clearly and completely with reference to the accompanying drawings. Evidently, the embodiments are exemplary only, without covering all embodiments of the present invention. Persons of ordinary skills in the art can derive other embodiments from the embodiments given herein without making any creative effort, and all such embodiments are covered in the protection scope of the present invention.

Figure 1:
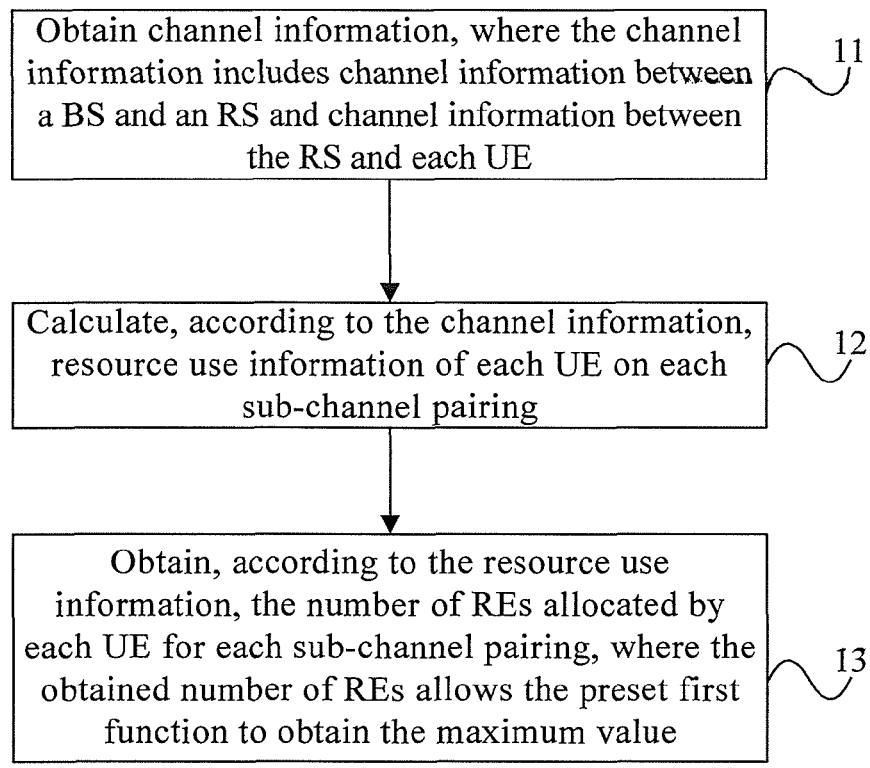
FIG. 1 is a schematic flowchart of a method according to a first embodiment of the present invention.

FIG. 1 is a schematic flowchart of a method according to a first embodiment of the present invention. The method includes the following steps:

Step 11: Obtain channel information, where the channel information includes the channel information between a base station (Base Station, BS) and an RS and the channel information between the RS and each user equipment (User Equipment, UE).

The resource allocation mechanism according to embodiments of the present invention may adopt a distributed approach or a centralized approach. The distributed approach refers to that: the RS measures a communication link between the RS and the BS to obtain the channel information between the RS and the BS, and a UE measures a communication link between the RS and the UE to obtain the channel information between the RS and the UE and reports the channel information to the RS, and the RS performs the following allocation. The centralized approach refers to: the RS measures a communication link between the RS and the BS to obtain the channel information between the RS and the BS, a UE measures a communication link between the RS and UE to obtain the channel information between the RS and the UE, then the RS reports the channel information between the RS and the BS to the BS, and the RS (it is required that the UE reports, in advance, the channel information between the RS and the BS to the BS) or the UE reports the channel information between the RS and the UE to the BS for centralized allocation.

The channel information may specifically be the signal-to-noise ratio (SNR) of the communication link; for example, $SNR_i^{(R)}$ indicates an SNR of the communication link between the BS and the RS on the sub-channel indexed by i (sub-channel $i_t$ for short); $SNR_j^{(m)}$ indicates an SNR of the communication link between the RS and the UE indexed by m (user equipment m for short) on the sub-channel indexed by j (sub-channel j for short). The channel information may also be a Signal-to-Interference and Noise Ratio (SINR); for example, $SINR_i^{(R)}$ indicates the SINR of the communication link between the BS and the RS on the sub-channel i; $SINR_j^{(m)}$ indicates the SINR of the communication link between the RS and the m on the sub-channel j. This embodiment of the present invention takes the SNR as an example.

Step 12: Calculate, according to the channel information, resource use information of each UE on each sub-channel pairing.

The resource use information of each UE on each sub-channel pairing may be indicated by $b_{ij}^{(m)}$ which indicates the number of bits that may be carried by each resource element (RE) of the m on the sub-channel pairing indexed by (i, j) (sub-channel pairing (i, j) for short).

Step 13: Obtain, according to the resource use information, the number of resource elements (REs) allocated to each UE on each sub-channel pairing, where the obtained number of the REs enables the preset first function to obtain the maximum value.

Each RE is the smallest element in the resource allocation or a resource set containing several smallest elements; each RE is smaller than each sub-channel.

The first function may correspond to different scheduling principles, which may be specifically:

$$\sum_{m=1}^{M} \frac{1}{1-\gamma} \left( \frac{1}{T_c} \sum_{i=1}^{N} \sum_{j=1}^{N} b_{ij}^{(m)} x_{ij}^{(m)} \right)^{1-\gamma} ;$$

where $1 \leq i, j \leq N$; $1 \leq m \leq M$; $b_{ij}^{(m)}$ indicates the number of bits that may be carried by each RE of the user equipment m on the sub-channel pairing (i, j); N indicates the number of sub-channels; M indicates the number of user equipments; $T_c$ indicates the duration of a transmission frame; γ indicates a fairness factor, and a different γ corresponds to a different scheduling principle; $x_{ij}^{(m)}$ indicates the number of REs allocated to the user equipment m on the sub-channel pairing (i, j). Considering the subsequent calculation process, should be guaranteed that the initial value of $x_{ij}^{(m)}$ is close to 0 and smaller than 1, such as 0.01.

The resource scheduling may be based on sub-channels. In the prior art, the resource allocation is also based on sub-channels, causing that during the scheduling, the resource can only be allocated to one UE. This embodiment of the present invention, however, realizes the resource allocation based on REs by obtaining the number of REs, and thereby the resource may be allocated to different UEs during the scheduling, so that the resources of each sub-channel may be fully utilized, improving the use efficiency. In addition, in this embodiment, $x_{ij}^{(m)}$ is obtained according to the maximum first function; the first function may correspond to different scheduling principles according to different values of γ, so that different scheduling principles may adopt the same scheduling method (The first function obtains the maximum value.) So when the scheduling principle changes, there is no need to design a new scheduling method, thereby improving the applicability and universality of the scheduling method.

Figure 2:
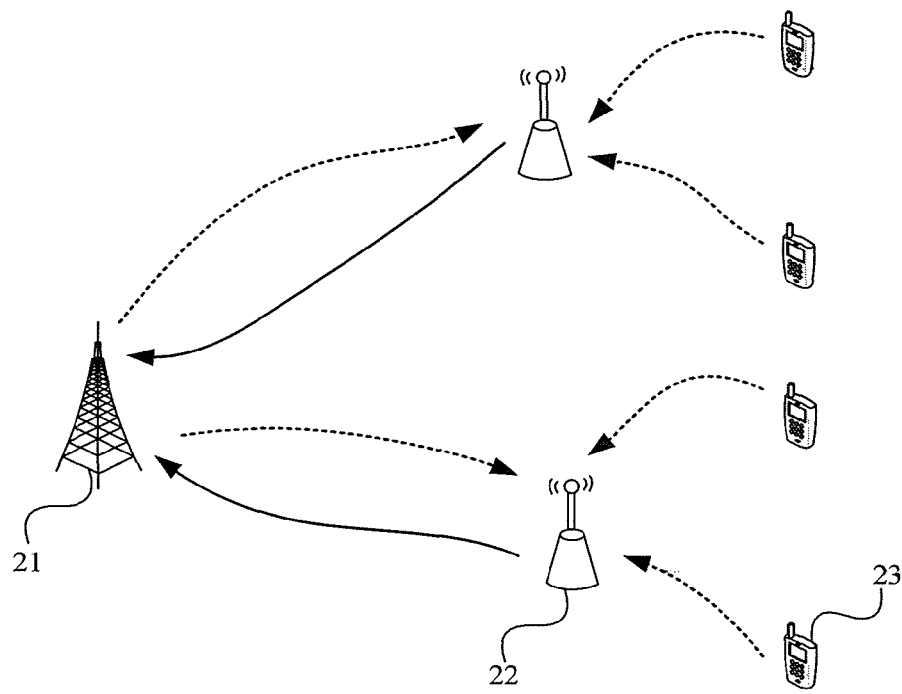
FIG. 2 is a schematic structural diagram of a system on which the first embodiment of the present invention is based.

FIG. 2 is a schematic structural diagram of a system on which the first embodiment of the present invention is based. Referring to FIG. 2, a BS 21, multiple RSs 22 and multiple UEs 23 are included. Assume that every node employs a single-antenna and the RSs 22 work in AF mode. This embodiment of the present invention takes one RS as an example; for a situation of multiple RSs, the BSs may allocate non-overlapping and non-interfering time-frequency resources for each RS, which may be deducted by extending the method according to this embodiment of the present invention from on single RS to a network of multiple RSs.

Figure 3:
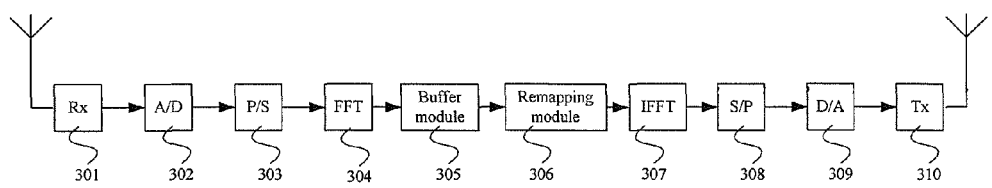
FIG. 3 is a schematic structural diagram of an RS in the system on which the first embodiment of the present invention is based.

FIG. 3 is a schematic structural diagram of an RS in the system on which the first embodiment of the present invention is based; referring to FIG. 3, the RS in AF mode includes a receiving module (Rx) 301, an analog-to-digital converting module (A/D) 302, a parallel-to-serial converting module (P/S) 303, a Fourier transforming module (FFT) 304, a buffer module (Buffer) 305, a remapping module 306, an inverse Fourier transforming module (IFFT) 307, a serial-to-parallel converting module (S/P) 308, a digital-to-analog converting module (D/A) 309 and a transmitting module (Tx) 310.

Taking downlink (BS-RS-UE direction) as an example, the working process for this RS is mainly as follows: first, the receiving module 301 receives and samples signals sent by the BS; then, the analog-to-digital converting module 302 and the parallel-to-serial converting module 303 perform analog-to-digital conversion and parallel-to-serial conversion respectively on the sampled signals, that is, the analog-to-digital converting module 302 performs analog-to-digital on the sampled signals, and subsequently the parallel-to-serial converting module 303 performs parallel-to-serial conversion on the output signals from module 302, and then the Fourier transforming module 304 of the RS performs Fourier transformation on the sampled signals and buffers them in the buffer module 305 of a buffer zone. Assume the duration of every RE is $T_b$ seconds; after the RS receives data of $T_b$ seconds, the RS has one RE signal on every sub-channel; later, the RS may remap received RE signals through the remapping module 306 to other sub-channels, and then perform inverse Fourier transformation through the inverse Fourier transforming module 307; afterwards, the serial-to-parallel converting module 308 and the digital-to-analog converting module 309 perform serial-to-parallel conversion and digital-to-analog conversion respectively to obtain signals for transmission which are to be transmitted by the transmitting module 310. That is, serial-to-parallel converting module 308 performs serial-to-parallel conversion on the sampled signals, and subsequently the digital-to-analog converting module 309 performs digital-to-analog conversion on the output signals from module 308 to obtain signals for transmission which are to be transmitted by the transmitting module 310. Generally speaking, before the RS sends data, each sub-channel may cache $\frac{T}{2}RE$, allowing scheduling of data of multiple users that are of different time and sub-channels, where T is the number of timeslots that each transmission frame includes.

Figure 4:
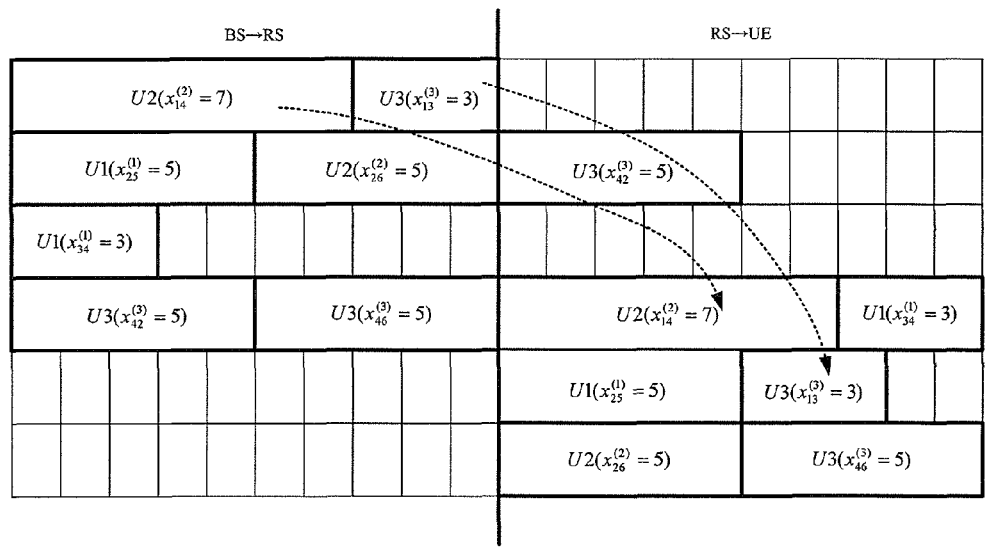
FIG. 4 is schematic diagram of RS scheduling in AF mode according to the first embodiment of the present invention.

FIG. 4 is schematic diagram of RS scheduling in AF mode according to the first embodiment of the present invention. Referring to FIG. 4, use N=6 sub-channels and the downlink transmission of T=20 timeslots as an example. Um $(x_{ij}^{(m)}=X)$ indicates that, for the UE indexed by m, an input sub-channel of RS is indexed by i; an output sub-channel is indexed by j; the number of the allocated REs is X. The allocation method according to this embodiment of the present invention is to find the optimal X corresponding to every user equipment m and every sub-channel pairing (i, j)

Figure 5:
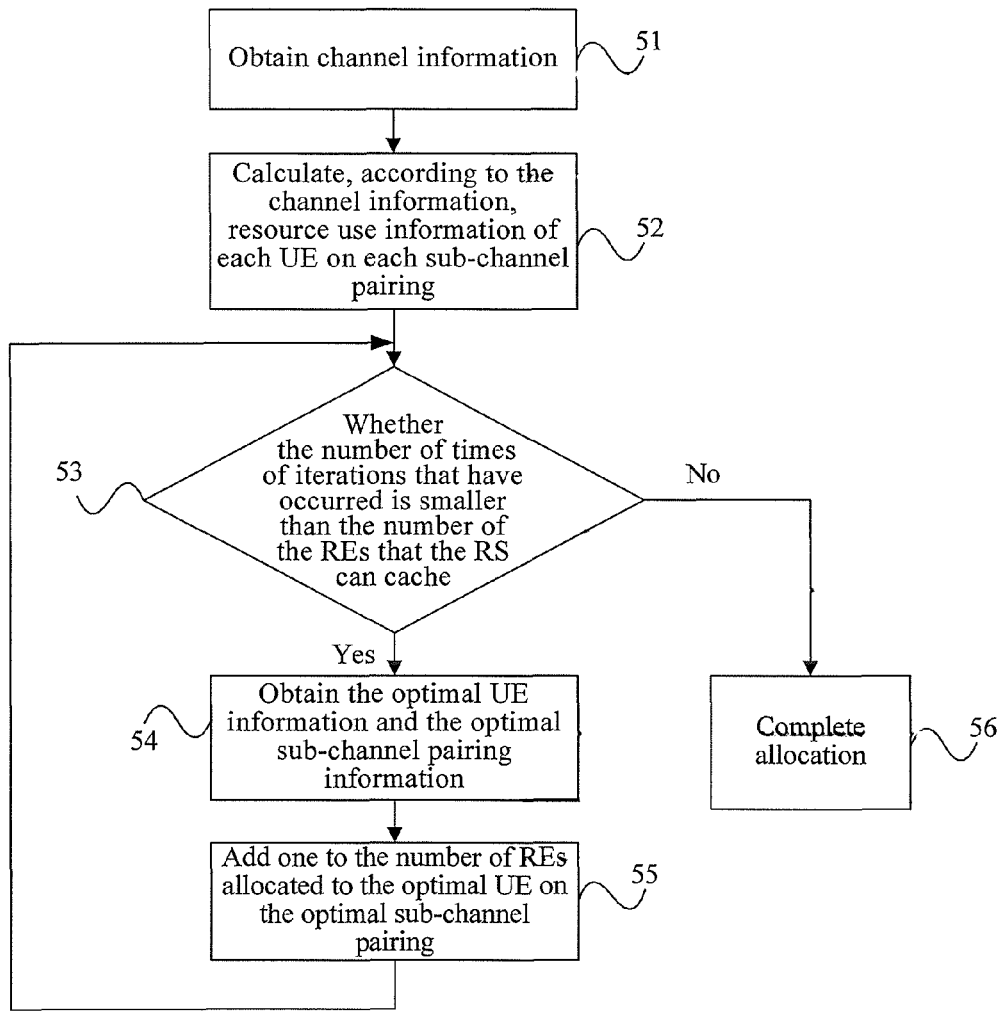
FIG. 5 is a schematic flowchart of a method according to a second embodiment of the present invention.

FIG. 5 is a schematic flowchart of a method according to a second embodiment of the present invention. This embodiment uses downlink transmission (BS-RS-UE) as an example and a similar method may be adopted in uplink transmission (UE-RS-BS).

Referring to FIG. 5, this embodiment includes the following:

Step 51: Obtain channel information.

The channel information includes $SNR_i^{(R)}$ indicating an SNR of a communication link between a BS and an RS on a sub-channel i and $SNR_j^{(m)}$ indicating an SNR of a communication link between the RS and a UE m on a sub-channel j.

Step 52: Calculate, according to the channel information, resource use information of each UE on each sub-channel pairing.

The resource use information may be the number of bits that may be carried, for example, $b_{ij}^{(m)}$ indicates the number of bits that may be carried by each RE of the user equipment m on the sub-channel pairing (i, j)

$b_{ij}^{(m)}$ may be obtained from the channel information by adopting the following process:

First, the equivalent SNR of a two-hop link may be expressed as follows:

$$SNR_{ij}^{(m)} = \frac{SNR_i^{(R)} SNR_j^{(m)}}{SNR_i^{(R)} + SNR_j^{(m)} + 1};$$

then, $R_{ij}^{(m)} = W_b \log(1 + SNR_{ij}^{(m)})$; $R_{ij}^{(m)}$ indicates a transmission rate of the UE m on the sub-channel pairing (i, j).

$W_b$ is the bandwidth of each RE.

Further, $b_{ij}^{(m)} = f(R_{ij}^{(m)})$.

f(*) indicates a mapping according to Adaptive Modulation and Coding (AMC); so far, the resource use information $b_{ij}^{(m)}$ of each UE on each sub-channel pairing may be calculated.

In this embodiment of the present invention, in order to improve the applicability, a general distribution principle is adopted, which is a utility function of a UE in the following:

After the number of bits is calculated, the UE m may be expressed as follows:

$$\gamma_m = \frac{1}{T_c} \sum_{i=1}^{N} \sum_{j=1}^{N} b_{ij}^{(m)} x_{ij}^{(m)},$$

where $T_c$ is the duration of a transmission frame; $x_{ij}^{(m)}$ indicates the number of REs allocated to the user equipment m on the sub-channel pairing (i, j).

The utility function of the UE m may be expressed as follows:

$$U_m(\ldots, x_{ij}^{(m)}, \ldots, \gamma) = \begin{cases} \frac{1}{1-\gamma}\left(\frac{1}{T_c}\sum_{i=1}^{N}\sum_{j=1}^{N} b_{ij}^{(m)} x_{ij}^{(m)}\right)^{1-\gamma} & \gamma \neq 1 \\ \log\left(\sum_{i=1}^{N}\sum_{j=1}^{N} b_{ij}^{(m)} x_{ij}^{(m)}\right) & \gamma = 1 \end{cases};$$

where $\gamma \geq 0$, and $\gamma$ is a factor affecting fairness; therefore, the network utility function is the sum of all UEs' utility.

A compromise between the network capacity and the user fairness may be obtained by changing the value of $\gamma$.

Specifically:

when $\gamma=0$, the network utility equals to the capacity, which is shown as follows:

$$U_N(\ldots, x_{ij}^{(m)}, \ldots, \gamma) \underset{\gamma \to 0}{=} \sum_{m=1}^{M}\sum_{i=1}^{N}\sum_{j=1}^{N} b_{ij}^{(m)} x_{ij}^{(m)};$$

when $\gamma=1$, the corresponding user rate of the maximized network utility is proportionally fair, which is as follows:

$$U_N(\ldots, x_{ij}^{(m)}, \ldots, \gamma) \underset{\gamma \to 1}{=} \sum_{m=1}^{M} \log\left(\sum_{i=1}^{N}\sum_{j=1}^{N} b_{ij}^{(m)} x_{ij}^{(m)}\right);$$

when $\gamma=2$, the maximized network utility scheduling is equal to a minimized delay, which is shown as follows:

$$U_N(\ldots, x_{ij}^{(m)}, \ldots, \gamma) \underset{\gamma \to 2}{=} \sum_{m=1}^{M} \frac{1}{\sum_{i=1}^{N}\sum_{j=1}^{N} b_{ij}^{(m)} x_{ij}^{(m)}};$$

when $\gamma \to \infty$, the network utility approaches to max-min fair scheduling.

It may be seen that, by changing the value of $\gamma$, different scheduling principles may be obtained.

Based on the above analysis, the optimization problem of the allocation of the function including $\gamma$ may be summarized as follows:

$$\max\left\{\sum_{m=1}^{M} \frac{1}{1-\gamma}\left(\frac{1}{T_c}\sum_{i=1}^{N}\sum_{j=1}^{N} b_{ij}^{(m)} x_{ij}^{(m)}\right)^{1-\gamma}\right\};$$

and $\sum_{m=1}^{M}\sum_{j=1}^{N} x_{ij}^{(m)} \leq \frac{T}{2}, 1 \leq i \leq N$, $\sum_{m=1}^{M}\sum_{i=1}^{N} x_{ij}^{(m)} \leq \frac{T}{2}, 1 \leq j \leq N$, $x_{ij}^{(m)} \in \left\{0, \ldots, \frac{T}{2}\right\}, 1 \leq i \leq N, 1 \leq m \leq M$.

N indicates the number of sub-channels; M indicates the number of user equipments; $T_c$ indicates the duration of a transmission frame; $\gamma$ indicates a fairness factor; $b_{ij}^{(m)}$ indicates the number of bits that may be carried by each RE of the user equipment m on the sub-channel pairing (i, j); $x_{ij}^{(m)}$ indicates the number of REs allocated to the user equipment m on the sub-channel pairing (i, j); T indicates the number of timeslots that each transmission frame contains, that is the number of REs on each sub-channel.

The above optimization problem is a complicated Convex function optimization problem, where the complexity of optimal solution is very high. Therefore, the embodiment of the present invention proposes a gradient-based heuristic method for optimal resource allocation and scheduling. The main idea of this gradient-based heuristic method is to allocate the REs, one by one, to users in the gradient direction of the maximum objective function.

Assume that an RE needs to be allocated to the sub-channel paring (i, j) of the UE m. The following is obtained by expanding according to the Taylor series:

$$U_N(\ldots, x_{ij}^{(m)}+1, \ldots) \approx U_N(\ldots, x_{ij}^{(m)}, \ldots) + \frac{\partial}{\partial x_{ij}^{(m)}} U_N(\ldots, x_{ij}^{(m)}, \ldots)$$

where, $$\frac{\partial}{\partial x_{ij}^{(m)}} U_N(\ldots, x_{ij}^{(m)}, \ldots) = \frac{b_{ij}^{(m)}/T_c}{\left(\frac{1}{T_c}\sum_{i=1}^{N}\sum_{j=1}^{N} b_{ij}^{(m)} x_{ij}^{(m)}\right)^\gamma},$$

and this expression is strictly positive.

In order to solve the above optimization problem, the maximum value of the partial derivative expression may be obtained. In order to obtain the maximum value of the partial derivative expression, the REs may be allocated one by one to an optimal sub-channel paring of an optimal UE.

In this embodiment, the number $x_{ij}^{(m)}$ of REs allocated to each UE on each sub-channel pairing is obtained in iteration mode; during each iteration, the information of the optimal UE and information of the optimal sub-channel paring are obtained according to the resource use information and the input value of the number of REs allocated to each UE on each sub-channel pairing; the number of the REs allocated to the optimal UE on the optimal sub-channel pairing is increased by 1 and used as an input value of the next, iteration, where the times of iterations are the number of REs that can be cached by the RS.

The specific iteration process may be as follows:

Step 53: During each iteration, determine whether the number of times of the iterations that have occurred is smaller than the number of REs that can be cached by the RS; if yes, perform step 54; otherwise, perform step 56.

Step 54: Obtain the information m of the optimal UE and the information of the optimal sub-channel paring, i and j, according to the resource use information $b_{i0j0}^{(m)}$, $b_{ij}^{(m)}$ (1≦i0, j0≦N, 1≦i, j≦N) and the input value, $x_{i0j0}^{(m)}$ (1≦i0, j0≦N) of the number of the REs allocated to each UE on each sub-channel pairing.

The optimal i, j and m may be expressed by i*, j*, m* respectively, and the calculation formula may be as follows:

$$\{i^*, j^*, m^*\} = \arg\max_{\substack{1\leq m\leq M,\\1\leq i,j\leq N}} \left\{\frac{b_{ij}^{(m)}/T_c}{\left(\frac{1}{T_c}\sum_{i0=1}^{N}\sum_{j0=1}^{N} b_{i0j0}^{(m)} x_{i0j0}^{(m)}\right)^\gamma}\right\};$$

i*, j*, m* are respectively the i, j and m that allow the function $$\frac{b_{ij}^{(m)}/T_c}{\left(\frac{1}{T_c}\sum_{i0=1}^{N}\sum_{j0=1}^{N} b_{i0j0}^{(m)} x_{i0j0}^{(m)}\right)^\gamma}$$

to obtain the maximum value.

Step 55: Add one to the number of the REs allocated to the optimal UE in the optimal channel pairing ($x_{i^*j^*}^{m^*} \leftarrow x_{i^*j^*}^{m^*} + 1$) and use the obtained result as the input number of the next iteration. Afterwards, add one to the number of times of the iterations that have occurred, and then repeat the process from step 53.

Step 56: Complete the allocation.

The above steps 54-56 may correspond to the following codes:

Initial values: 1≦i, j≦N, 1≦m≦M, 1≦i0, j0≦N: $T_i^{(BS)}$=T/2, $T_j^{(RS)}$=T/2, $x_{i0j0}^{(m)}$=0.01;

| | |
|---|---|
| 1: | ∀i, j, m: $\tilde{b}_{ij}^{(m)} \leftarrow b_{ij}^{(m)}$ |
| 2: | while ∃$T_i^{(BS)}$ > 0 and ∃$T_j^{(BS)}$ > 0 do |
| 3: | $\{i^*, j^*, m^*\} \leftarrow \arg\max_{\substack{1\leq m\leq M,\\1\leq i,j\leq N}} \left\{\frac{\tilde{b}_{ij}^{(m)}/T_c}{\left(\frac{1}{T_c}\sum_{i0=1}^{N}\sum_{j0=1}^{N} b_{i0j0}^{(m)} x_{i0j0}^{(m)}\right)^\gamma}\right\}$ |
| 4: | $x_{i^*j^*}^{m^*} \leftarrow x_{i^*j^*}^{m^*} + 1$ |
| 5: | $T_{i^*}^{(BS)} \leftarrow T_{i^*}^{(BS)} - 1$ |
| 6: | $T_{j^*}^{(RS)} \leftarrow T_{j^*}^{(RS)} - 1$ |
| 7: | if $T_{i^*}^{(BS)}$ = 0 then |
| 8: | $\tilde{b}_{i^*j}^{(m)} \leftarrow 0, 1 \leq m \leq M, 1 \leq j \leq N$ |
| 9: | end if |
| 10: | if $T_{j^*}^{(RS)}$ = 0 then |
| 1: | $\tilde{b}_{ij^*}^{(m)} \leftarrow 0, 1 \leq m \leq M, 1 \leq i \leq N$ |
| 12: | end if |
| 13: | end while |

In this embodiment, system resources are allocated in the unit of RE, increasing the use efficiency of the system; and the applicability may be improved by adopting the above functions.

When the maximum value of the above partial derivative is calculated, if γ→∞, because the value of the partial derivative is very small, the result obtained according to the algorithm of the second embodiment may not be accurate enough. To improve the accuracy, the following method may be adopted.

Figure 6:
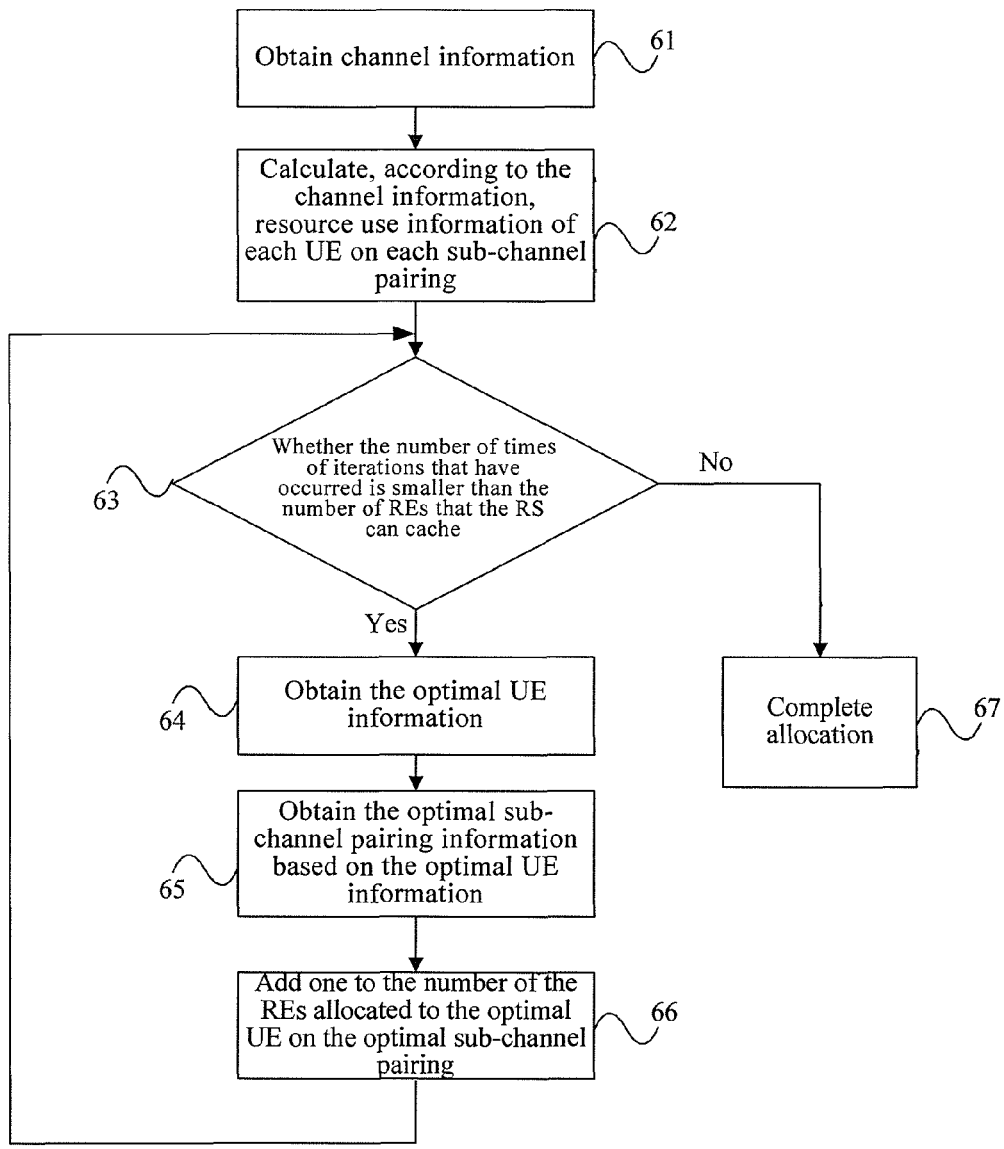
FIG. 6 is a schematic flowchart of a method according to a third embodiment of the present invention.

FIG. 6 is a schematic flowchart of a method according to a third embodiment of the present invention, including:

Steps 61 to 62 are corresponding and similar to steps 51-52.

Step 63: During each iteration, determine whether the number of times of the iterations that have occurred is smaller than the number of REs that can be cached by the RS; if yes, perform step 64; otherwise, perform step 67.

Step 64: Obtain the information m of the optimal UE according to the resource use information $b_{i0j0}^{(m)}$, $b_{ij}^{(m)}$ (1≦i0, j0≦N, 1≦i, j≦N) and the input value, $x_{i0j0}^{(m)}$ (1≦i0, j0≦N), of the number of REs allocated to each UE on each sub-channel pairing.

The optimal m may be expressed by m*, and the calculation formula may be as follows:

$$m^* = \arg\min_{1 \leq m \leq M}\left\{\sum_{i0=1}^{N}\sum_{j0=1}^{N} b_{i0,j0}^{(m)} x_{i0,j0}^{(m)}\right\};$$

where m* is the value of m that enables the function $$\sum_{i0=1}^{N}\sum_{j0=1}^{N} b_{i0,j0}^{(m)} x_{i0,j0}^{(m)}$$

to obtain the minimum value.

Step 65: Obtain the information of the optimal sub-channel paring i, j based on the information m of the optimal UE.

The optimal i, j may be expressed by i*, j* respectively, and the calculation formula may be as follows:

$$\{i^*, j^*\} = \arg\max_{1 \leq i,j \leq N}\{b_{ij}^{(m^*)}\};$$

where i*, j* are the respective i and j that allow the function $b_{ij}^{m^*}$ to obtain the maximum value.

Step 66: Add one to the number of the REs allocated to the optimal UE in the optimal channel pairing ($x_{i^*j^*}^{m^*} \leftarrow x_{i^*j^*}^{m^*} + 1$) and use the obtained result as the input number of the next iteration.

Afterwards, add one to the number of times of the iterations that have occurred, and then repeat the process from step 63.

Step 67: Complete the allocation.

The above steps 64-67 may correspond to the following codes:

Initial values: $1 \leq i, j \leq N$, $1 \leq m \leq M$, $1 \leq i0, j0 \leq N$; $T_i^{(BS)} = T/2$, $T_j^{(RS)} = T/2$, $x_{i0,j0}^{(m)} = 0.01$;

| | |
|---|---|
| 1: | $\forall i, j, m: \tilde{b}_{ij}^{(m)} \leftarrow b_{ij}^{(m)}$ |
| 2: | while $\exists T_i^{(BS)} > 0$ and $\exists T_j^{(BS)} > 0$ do |
| 3: | $m^* \leftarrow \arg\min_{1 \leq m \leq M}\left\{\sum_{i0=1}^{N}\sum_{j0=1}^{N} b_{i0,j0}^{(m)} x_{i0,j0}^{(m)}\right\}$ |
| 4: | $\{i^*, j^*\} \leftarrow \arg\max_{1 \leq i,j \leq N} \tilde{b}_{ij}^{(m^*)}$ |
| 5: | $x_{i^*j^*}^{m^*} \leftarrow x_{i^*j^*}^{m^*} + 1$ |
| 6: | $T_{i^*}^{(BS)} \leftarrow T_{i^*}^{(BS)} - 1$ |
| 7: | $T_{j^*}^{(RS)} \leftarrow T_{j^*}^{(RS)} - 1$ |
| 8: | if $T_{i^*}^{(BS)} = 0$ then |
| 9: | $\tilde{b}_{i^*j}^{(m)} \leftarrow 0, 1 \leq m \leq M, 1 \leq j \leq N$ |
| 10: | end if |
| 11: | if $T_{j^*}^{(RS)} = 0$ then |
| 12: | $\tilde{b}_{ij^*}^{(m)} \leftarrow 0, 1 \leq m \leq M, 1 \leq i \leq N$ |
| 13: | end if |
| 14: | end while |

This embodiment may further be applicable to the $\gamma \rightarrow \infty$ scenario based on the second embodiment.

In this embodiment, system resources are allocated in the unit of RE, increasing the use efficiency of the system; and the applicability may be improved by adopting the above functions.

Further, in the $\gamma \rightarrow \infty$ scenario, the algorithm according to this embodiment is more accurate; as a result, the accuracy is improved.

Figure 7:
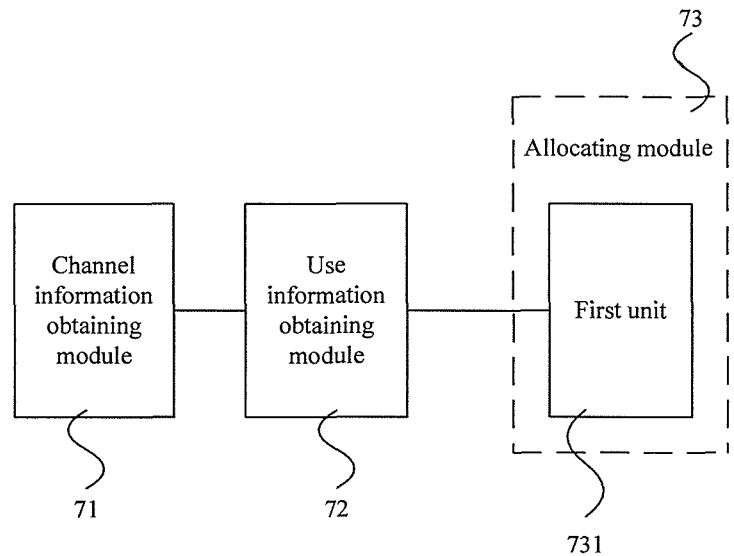
FIG. 7 is a schematic structural diagram of a device according to a fourth embodiment of the present invention.

FIG. 7 is a schematic structural diagram of a device according to a fourth embodiment of the present invention, including a channel information obtaining module 71, a use information obtaining module 72, and an allocating module 73. The channel information obtaining module 71 is configured to obtain channel information, where the channel information includes channel information between a BS and an RS and channel information between the RS and each UE. The use information obtaining module 72 is configured to calculate, according to the channel information, resource use information of each UE on each sub-channel pairing. The allocating module 73 is configured to obtain, according to the resource use information, the number of REs allocated to each UE on each sub-channel pairing, where the obtained number of the REs enables a preset first function to obtain the maximum value.

The first function may correspond to different scheduling principles, which may be specifically:

$$\sum_{m=1}^{M}\frac{1}{1-\gamma}\left(\frac{1}{T_c}\sum_{i=1}^{N}\sum_{j=1}^{N} b_{ij}^{(m)} x_{ij}^{(m)}\right)^{1-\gamma};$$

where N indicates the number of sub-channels; M indicates the number of UEs; $T_c$ indicates the duration of a transmission frame; $\gamma$ indicates a fairness factor, and a different $\gamma$ corresponds to a different scheduling principle; $x_{ij}^{(m)}$ indicates the number of REs allocated to the UE indexed by m on the sub-channel pairing indexed by (i, j).

The use information obtaining module 72 may adopt the following calculation formula:

$$b_{ij}^{(m)} = f(R_{ij}^{(m)});$$

where $b_{ij}^{(m)}$ indicates the number of bits that may be carried by each RE of the user equipment m in the sub-channel (i, j); f(*) indicates a mapping modulated according to adaptive codes; $R_{ij}^{(m)}$ indicates a transmission rate of the UE indexed by m on the sub-channel pairing indexed by (i, j), and a formula for calculating $R_{ij}^{(m)}$ is as follows:

$$R_{ij}^{(m)} = W_b \log(1 + SNR_{ij}^{(m)});$$

where $W_b$ is bandwidth of each RE, and a formula for calculating $SNR_{ij}^{(m)}$ is as follows:

$$SNR_{ij}^{(m)} = \frac{SNR_i^{(R)} SNR_j^{(m)}}{SNR_i^{(R)} + SNR_j^{(m)} + 1};$$

where $SNR_i^{(R)}$ is an SNR of a link between the BS and the RS on the sub-channel i; $SNR_j^{(m)}$ is an SNR of a link between the RS and the user equipment m on the sub-channel j.

The expression of the first function may be:

$$\max\left\{\sum_{m=1}^{M}\frac{1}{1-\gamma}\left(\frac{1}{T_c}\sum_{i=1}^{N}\sum_{j=1}^{N} b_{ij}^{(m)} x_{ij}^{(m)}\right)^{1-\gamma}\right\};$$

where $1 \leq i, j \leq N$, $1 \leq m \leq M$, and $b_{ij}^{(m)}$ indicates the number of bits that may be carried by the user equipment m on the sub-channel pairing (i, j); N indicates the number of sub-channels; M indicates the number of UEs; $T_c$ indicates the duration of a transmission frame; γ indicates a fairness factor, and a different γ corresponds to a different scheduling principle; $x_{ij}^{(m)}$ indicates the number of REs allocated to the user equipment m on the sub-channel pairing (i, j).

The allocating module 73 is specifically configured to: obtain the number of REs allocated to each UE on each sub-channel pairing in iteration mode; during each iteration, obtain the information of an optimal UE and information of an optimal sub-channel paring according to the resource use information and the input value of the number of REs allocated to each UE on each sub-channel pairing; add one to the number of REs allocated to the optimal. UE on the optimal sub-channel pairing and use the obtained number as an input value of the next iteration, where the number of times of iterations are the number of REs that can be cached by the RS.

The allocating module 73 includes a unit configured to obtain the information of an optimal UE and the information of the optimal sub-channel pairing, that is, a first unit 731.

The first unit 731 is configured to obtain i*, j*, m* using the following calculation formula:

$$\{i^*, j^*, m^*\} = \arg\max_{\substack{1 \le m \le M \\ 1 \le i,j \le N}} \left\{ \frac{b_{ij}^{(m)}/T_c}{\left(\frac{1}{T_c}\sum_{i0=1}^{N}\sum_{j0=1}^{N} b_{i0j0}^{(m)} x_{i0j0}^{(m)}\right)^{\gamma}} \right\};$$

where m* is the index of the optimal UE; (i*, j*) is the index of the optimal sub-channel pairing; $b_{i0j0}^{(m)}$ is the number of bits that may be carried by each RE of the UE indexed by m on the sub-channel paring indexed by (i0, j0); $x_{i0j0}^{(m)}$ is an input value of the number of REs allocated to the UE indexed by m on the sub-channel paring indexed by (i0, j0), that is, the number of REs allocated after the previous iteration.

Further, the device according to this embodiment may be located at the RS side or at the BS side; when it is at the RS side, the channel information obtaining module 71 is specifically configured to obtain the channel information between the RS and the BS by measurement, and to receive the channel information between the RS and UE that is obtained by measurement and reported by the UE; when it is at the ES side, the channel information obtaining module 71 is specifically configured to receive the channel information between the RS and BS that is obtained by measurement and reported by the RS; and to receive the channel information reported directly by the UE or reported by the UE through the RS, where the channel information between the RS and BS is obtained by the UE by measurement.

In this embodiment, system resources are allocated in the unit of RE, increasing the use efficiency of the system; and the applicability may be improved by adopting the above functions.

Figure 8:
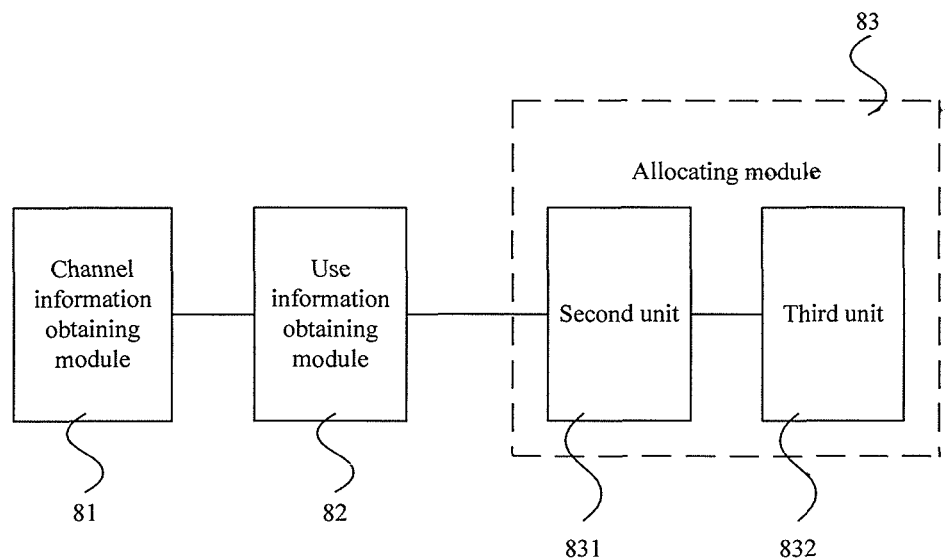
FIG. 8 is a schematic structural diagram of a device according to a fifth embodiment of the present invention.

FIG. 8 is a schematic structural diagram of a device according to a fifth embodiment of the present invention, including a channel information obtaining module 81, a use information obtaining module 82, and a allocating module 83. The channel information obtaining module 81 is configured to obtain channel information, where the channel information includes channel information between a BS and an RS and channel information between the RS and each UE. The use information obtaining module 82 is configured to calculate resource use information of each UE on each sub-channel pairing according to the channel information. The allocating module 83 is configured to obtain, according to the resource use information, the number of REs allocated to each UE on each sub-channel pairing, where the obtained number of the REs enables a preset first function to obtain the maximum value.

The first function may correspond to different scheduling principles, which may be specifically:

$$\sum_{m=1}^{M} \frac{1}{1-\gamma} \left( \frac{1}{T_c} \sum_{i=1}^{N} \sum_{j=1}^{N} b_{ij}^{(m)} x_{ij}^{(m)} \right)^{1-\gamma};$$

where N indicates the number of sub-channels; M indicates the number of UEs; $T_c$ indicates the duration of a transmission frame; γ indicates a fairness factor, and a different γ corresponds to a different scheduling principle; $x_{ij}^{(m)}$ indicates the number of REs allocated to the UE indexed by m in pairing of the sub-channel indexed by (i, j).

The use information obtaining module 82 may adopt the calculation formula, $b_{ij}^{(m)} = f(R_{ij}^{(m)})$;

where $b_{ij}^{(m)}$ indicates the number of bits that may be carried by each RE of the user equipment m on the sub-channel pairing (i, j); f(*) indicates a mapping modulated according to adaptive codes; $R_{ij}^{(m)}$ indicates a transmission rate of the UE indexed by m on the sub-channel pairing indexed by (i, j), and a formula for calculating $R_{ij}^{(m)}$ is as follows:

$R_{ij}^{(m)} = W_b \log(1+SNR_{ij}^{(m)})$;

where $W_b$ is bandwidth of each RE, and a formula for calculating $SNR_{ij}^{(m)}$ is as follows:

$$SNR_{ij}^{(m)} = \frac{SNR_i^{(R)} SNR_j^{(m)}}{SNR_i^{(R)} + SNR_j^{(m)} + 1};$$

where $SNR_i^{(R)}$ is an SNR of a link between the BS and the RS on the sub-channel i; $SNR_j^{(m)}$ is an SNR of a link between the RS and the UE m on the sub-channel j.

The expression of the first function may be:

$$\max\left\{ \sum_{m=1}^{M} \frac{1}{1-\gamma} \left( \frac{1}{T_c} \sum_{i=1}^{N} \sum_{j=1}^{N} b_{ij}^{(m)} x_{ij}^{(m)} \right)^{1-\gamma} \right\};$$

where $1 \le i, j \le N$, $1 \le m \le M$, and $b_{ij}^{(m)}$ indicates the number of bits that may be carried by the user equipment m on the sub-channel pairing (i, j); N indicates the number of sub-channels; M indicates the number of UEs; $T_c$ indicates the duration of a transmission frame; γ indicates a fairness factor, and a different γ corresponds to a different scheduling principle; $x_{ij}^{(m)}$ indicates the number of REs allocated to the user equipment m on the sub-channel pairing (i, j).

The allocating module 83 is specifically configured to obtain the number of REs allocated to each UE on each sub-channel pairing in iteration mode; during each iteration, obtain the information of an optimal UE and information of an optimal sub-channel paring according to the resource use information and the input value of the number of REs allocated to each UE on each sub-channel pairing; add one to the number of REs allocated to the optimal UE on the optimal sub-channel pairing and use the obtained number as an input value of the next iteration, where the number of times of iterations are the number of REs that can be cached by the RS.

The allocating module 83 includes units configured to obtain the information of the optimal UE and the information of the optimal sub-channel pairing, they are a second unit 831 and a third unit 832.

The second unit 831 is configured to obtain m using the following calculation formula:

$$m^* = \operatorname*{argmin}_{1 \le m \le M}\left(\sum_{i0=1}^{N}\sum_{j0=1}^{N} b_{i0,j0}^{(m)} x_{i0,j0}^{(m)}\right);$$

the third unit 832 is configured to obtain i*, j* based on m* using the following formula:

$$\{i^*, j^*\} = \operatorname*{arg\,max}_{1 \le i,j \le N}\{b_{ij}^{(m^*)}\};$$

where m* is the index of the optimal UE; (i*, j*) is the index of the optimal sub-channel pairing; $b_{i0j0}^{(m)}$ is the number of bits that may be carried by each RE of the UE indexed by m on the sub-channel paring indexed by (i0, j0); $x_{i0j0}^{(m)}$ is an input value of the number of REs allocated to the UE indexed by m on the sub-channel paring indexed by (i0, j0).

Further, the device according to this embodiment may be located at the RS side or at the ES side; when it is at the RS side, the channel information obtaining module 81 is specifically configured to obtain the channel information between the RS and the BS by measurement, and to receive the channel information between the RS and UE that is obtained by measurement and reported by the UE; when it is at the BS side, the channel information obtaining module 81 is specifically configured to receive the channel information between the RS and BS that is obtained by measurement and reported by the RS; and to receive the channel information reported directly by the UE or reported by the UE through the RS, where the channel information between the RS and BS is obtained by the UE by measurement.

This embodiment may further be applicable to the $\gamma \to \infty$ scenario based on the fourth embodiment.

In this embodiment, system resources are allocated in the unit of RE, increasing the use efficiency of the system; and the applicability may be improved by adopting the above functions. Further, in the $\gamma \to \infty$ scenario, the algorithm according to this embodiment is more accurate; as a result, the accuracy is improved.

It should be noted that, the modifiers "the first", "the second", and so on before the embodiments of the present invention are only for distinguishing each embodiment but not for representing the preferences of them.

Persons of ordinary skills in the art may understand that all or part of steps according to the embodiments of the present invention may be implemented by a program instructing relevant hardware. The programs may be stored in a computer readable storage medium. When the programs are executed, the steps of the methods in the embodiments are executed. The storage medium includes any medium capable of storing program codes, such as a read-only memory (ROM), a random access memory (RAM), a magnetic disk or a compact disc-read only memory (CD-ROM).

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not cause the essence of corresponding technical solutions to depart from the spirit and scope of the present invention.

What is claimed is:

1. A resource allocation method for an amplify-and-forward relay network, the method comprising:
   obtaining channel information, wherein the channel information includes channel information between a base station (BS) and a relay station (RS) and channel information between the RS and each user equipment (UE);
   calculating, according to the channel information, resource use information of each UE on each sub-channel pairing; and
   obtaining, according to the resource use information, the number of resource elements REs allocated to each UE on each sub-channel pairing, wherein the obtained number of the REs enables a preset first function to obtain a maximum value;
   wherein the channel information is the signal-to-noise ratio and the resource use information is the number of bits; a formula for calculating, according to the channel information, resource use information of each UE on each sub-channel pairing is:

$$b_{ij}^{(m)} = f(R_{ij}^{(m)});$$

wherein $b_{ij}^{(m)}$ indicates the number of bits that may be carried by each RE of the UE indexed by m on a sub-channel pairing indexed by (i, j); f(*) indicates a mapping modulated according to adaptive codes; $R_{ij}^{(m)}$ indicates a transmission rate of the UE indexed by m on the sub-channel pairing indexed by (i, j), and a formula for calculating $R_{ij}^{(m)}$ as follows:

$$R_{ij}^{(m)} = W_b \log(1 + SNR_{ij}^{(m)});$$

wherein $W_b$ is bandwidth of each RE, and a formula for calculating $SNR_{ij}^{(m)}$ is as follows:

$$SNR_{ij}^{(m)} = \frac{SNR_i^{(R)} SNR_j^{(m)}}{SNR_i^{(R)} + SNR_j^{(m)} + 1};$$

wherein $SNR_i^{(R)}$ is the signal-to-noise ratio of a communication link between the BS and the RS on a sub-channel indexed by i; $SNR_j^{(m)}$ is the signal-to-noise ratio of a communication link between the RS and the UE indexed by m on the sub-channel indexed by i.

2. The method according to claim 1, wherein the first function is expressed as follows:

$$\sum_{m=1}^{M} \frac{1}{1-\gamma}\left(\frac{1}{T_c}\sum_{i=1}^{N}\sum_{j=1}^{N} b_{ij}^{(m)} x_{ij}^{(m)}\right)^{1-\gamma};$$

wherein N indicates the number of sub-channels; M indicates the number of UEs; $T_c$ indicates a duration of a transmission frame; $\gamma$ indicates a fairness factor, and a different $\gamma$ corresponds to a different scheduling principle; $x_{ij}^{(m)}$ indicates the number of REs allocated to the UE indexed by m on the sub-channel pairing indexed by (i, j).

3. The method according to claim 2, wherein the obtaining, according to the resource use information, the number of REs allocated to each UE on each sub-channel pairing comprises:

obtaining the number of REs allocated to each UE on each sub-channel pairing in iteration mode;

during each iteration, obtaining information of an optimal UE and information of an optimal sub-channel pairing according to the resource use information and an input value of the number of REs allocated to each UE on each sub-channel pairing;

adding one to the number of the REs allocated to the optimal UE on the optimal sub-channel pairing and using the obtained number as an input value of a next iteration, wherein the number of times of iterations are the number of REs that can be cached by the RS.

4. The method according to claim 3, wherein, the obtaining the information of the optimal UE and optimal sub-channel paring information according to the resource use information and the input value of the number of REs allocated to each UE on each sub-channel pairing, comprises:

obtaining i*, j*, m* by using the following calculation formula:

$$\{i^*, j^*, m^*\} = \underset{\substack{1 \leq m \leq M \\ 1 \leq i,j \leq N}}{\operatorname{argmax}} \left\{ \frac{b_{ij}^{(m)}/T_c}{\left(\frac{1}{T_c}\sum_{i0=1}^{N}\sum_{j0=1}^{N} b_{i0j0}^{(m)} x_{i0j0}^{(m)}\right)^{\gamma}} \right\};$$

wherein m* is the index of the optimal UE; (i*, j*) is the index of the optimal sub-channel pairing; $b_{i0j0}^{(m)}$ is the number of bits that may be carried by each RE of the UE indexed by m on a sub-channel paring indexed by (i0, j0); $x_{i0j0}^{(m)}$ is an input value of the number of REs allocated to the UE indexed by m on the sub-channel paring indexed by (i0, j0).

5. The method according to claim 3, wherein, the obtaining the information of the optimal UE and optimal sub-channel paring information according to the resource use information and the input value of the number of REs allocated to each UE on each sub-channel pairing, comprises:

obtaining m* by using the following calculation formula:

$$m^* = \underset{1 \leq m \leq M}{\operatorname{argmin}} \left\{ \sum_{i0=1}^{N}\sum_{j0=1}^{N} b_{i0j0}^{(m)} x_{i0j0}^{(m)} \right\};$$

obtaining, based on m*, i*, j* by using the following calculation formula:

$$\{i^*, j^*\} = \arg\underset{1 \leq i,j \leq N}{\max} \{b_{ij}^{(m^*)}\};$$

wherein m* is the index of the optimal UE; (i*, j*) is the index of the optimal sub-channel pairing; $b_{i0j0}^{(m)}$ is the number of bits that may be carried by each RE of the UE indexed by m on a sub-channel paring indexed by (i0, j0); $x_{i0j0}^{(m)}$ is an input value of the number of REs allocated to the UE indexed by m on the sub-channel paring indexed by (i0, j0).

6. The method according to claim 1, wherein the obtaining the channel information comprises:

obtaining, by the RS, the channel information between the RS and the BS that is obtained by measurement; and receiving, by the RS, the channel information between the RS and a UE that is obtained by measurement and reported by the UE.

7. The method according to claim 1, wherein the obtaining the channel information comprises:

receiving, by the BS, the channel information between the RS and the BS that is obtained by measurement and reported by the RS.

8. The method according to claim 1, wherein the obtaining the channel information comprises:

receiving, by the BS, the channel information between the RS and the UE that is reported directly by the UE or reported by the UE through the RS, wherein the channel information between the RS and the UE is obtained by the UE by measurement.

9. A resource allocation device for an amplify-and-forward relay network, the device comprising:

a processor; and a memory coupled to the processor and storing instructions that, when executed by the processor, cause the processor to:

obtain channel information, wherein the channel information comprises channel information between a base station (BS) and an relay station (RS) and channel information between an RS and each user equipment (UE);

calculate, according to the channel information, resource use information of each UE on each sub-channel pairing; and obtain, according to the resource use information, the number of resource elements REs allocated to each UE on each sub-channel pairing, wherein the obtained number of the REs enables a preset first function to obtain a maximum value;

wherein the channel information is the signal-to-noise ratio; the resource use information is the number of bits; and a formula for calculating, according to the channel information, resource use information of each UE on each sub-channel pairing is:

$$b_{ij}^{(m)} = f(R_{ij}^{(m)});$$

wherein $b_{ij}^{(m)}$ indicates the number of bits that may be carried by each RE of a UE indexed by m on a sub-channel pairing indexed by (i, j); f(*) indicates a mapping modulated according to adaptive codes; $R_{ij}^{(m)}$ indicates a transmission rate of the UE indexed by m on the sub-channel pairing indexed by and (i, j), and a formula for calculating $R_{ij}^{(m)}$ is as follows:

$$R_{ij}^{(m)} = W_b \log(1 + SNR_{ij}^{(m)});$$

wherein $W_b$ is bandwidth of each RE, and a formula for calculating $SNR_{ij}^{(m)}$ is as follows:

$$SNR_{ij}^{(m)} = \frac{SNR_i^{(R)} SNR_j^{(m)}}{SNR_i^{(R)} + SNR_j^{(m)} + 1};$$

wherein $SNR_i^{(R)}$ is a signal-to-noise ratio of a communication link between the BS and RS on a sub-channel indexed by i; $SNR_j^{(m)}$ is a signal-to-noise ratio of a communication link between the RS and the UE indexed by m on the sub-channel indexed by j.

10. The device according to claim 9, wherein the first function is expressed as follows:

$$\sum_{m=1}^{M} \frac{1}{1-\gamma} \left( \frac{1}{T_c} \sum_{i=1}^{N} \sum_{j=1}^{N} b_{ij}^{(m)} x_{ij}^{(m)} \right)^{1-\gamma};$$

wherein N indicates the number of sub-channels; M indicates the number of UEs; $T_c$ indicates the duration of a transmission frame; γ indicates a fairness factor, and a different γ corresponds to a different scheduling principle; $x_{ij}^{(m)}$ indicates the number of REs allocated to the UE indexed by m on a sub-channel pairing indexed by (i, j).

11. The device according to claim 9, further comprising instructions that, when executed by the processor, cause the processor to:
   obtain the number of REs allocated to each UE on each sub-channel pairing in iteration mode;
   obtain, during each iteration, information of an optimal UE and information of an optimal sub-channel paring according to the resource use information and an input value of the number of REs allocated to each UE on each sub-channel pairing; and
   add one to the number of the REs allocated to the optimal UE on the optimal sub-channel pairing and to use the obtained number as an input value of the next iteration, wherein the number of times of iterations are the number of REs that can be cached by the RS.

12. The device according to claim 11, wherein the instructions that cause the processor to obtain the information of the optimal UE and the information of the optimal sub-channel pairing include:
   first instructions, or second instructions and third instructions;
   wherein, the first instructions cause the processor to obtain i*, j*, m* using the following formula:

$$\{i^*, j^*, m^*\} = \underset{\substack{1 \leq m \leq M, \\ 1 \leq i, j \leq N}}{\operatorname{argmax}} \left\{ \frac{b_{ij}^{(m)} / T_c}{\left( \frac{1}{T_c} \sum_{i0=1}^{N} \sum_{j0=1}^{N} b_{i0j0}^{(m)} x_{i0j0}^{(m)} \right)^{\gamma}} \right\};$$

wherein m* is the index of the optimal UE; (i*, j*) is the index of the optimal sub-channel pairing; $b_{i0j0}^{(m)}$ is the number of bits that may be carried by each RE of the UE indexed by m on a sub-channel paring indexed by (i0, j0); $x_{i0j0}^{(m)}$ is an input value of the number of REs allocated to the UE indexed by m on the sub-channel paring indexed by (i0, j0);

the second unit is configured instructions cause the processor to obtain m* using the following formula:

$$m^* = \underset{1 \leq m \leq M}{\operatorname{argmin}} \left\{ \sum_{i0=1}^{N} \sum_{j0=1}^{N} b_{i0j0}^{(m)} x_{i0j0}^{(m)} \right\};$$

the third instructions cause the processor to obtain i*, j* based on m* using the following formula:

$$\{i^*, j^*\} = \underset{1 \leq i, j \leq N}{\operatorname{arg\,max}} \left\{ b_{ij}^{(m^*)} \right\};$$

wherein m* is the index of the optimal UE; (i*, j*) is the index of the optimal sub-channel pairing; $b_{i0j0}^{(m)}$ is the number of bits that may be carried by each RE of the UE indexed by m on a sub-channel paring indexed by (i0, j0); $x_{i0j0}^{(m)}$ is the input value of the number of REs allocated to the UE indexed by m on the sub-channel paring indexed by (i0, j0).

13. The device according to claim 9, wherein
   the device is arranged in the RS, and further comprising instructions that, when executed by the processor, cause the processor to receive the channel information between the RS and BS obtained by measurement and to receive the channel information between the RS and a UE that is obtained by measurement and reported by the UE; or
   the device is arranged in the BS, and further comprising instructions that, when executed by the processor, cause the processor to receive the channel information between the RS and BS that is obtained by measurement and reported by the RS, and to receive the channel information between the RS and the UE that is reported directly by the UE or reported by the UE through the RS, wherein the channel information between the RS and the UE is obtained by the UE by measurement.

* * * * *

UNITED STATES PATENT AND TRADEMARK OFFICE
CERTIFICATE OF CORRECTION

| | | |
|---|---|---|
| PATENT NO. | : 8,477,679 B2 | Page 1 of 1 |
| APPLICATION NO. | : 13/633498 | |
| DATED | : July 2, 2013 | |
| INVENTOR(S) | : Alireza Sharifian et al. | |

It is certified that error appears in the above-identified patent and that said Letters Patent is hereby corrected as shown below:

In the Claims

Column 17, Claim 11, line 20, delete "paring" and insert -- pairing --.

Column 18, Claim 12, line 6, delete "unit is configured".

Signed and Sealed this
Fifteenth Day of April, 2014

Michelle K. Lee
*Deputy Director of the United States Patent and Trademark Office*